Patented July 20, 1943

2,324,838

UNITED STATES PATENT OFFICE 2,324,838

FILTER MATERIAL

Walter Harz, Dormagen, Kreis Neuss, Herbert Rein, Leipzig, Emil Hubert, Dessau-Ziebigk, and Carl Kayser, Bitterfeld, Germany; vested in the Alien Property Custodian No Drawing. Application January 5, 1938, Serial No. 183,454. In Germany June 13, 1936

5 Claims. (Cl. 210—204)

Our present invention relates to filters for industrial purposes.

Large scale filtration of strong acids, alkalies, or solutions of oxidizing action has always presented difficulties because filter layers suitable for this purpose which are easily obtained and of sufficient mechanical strength and which are in the form of fabrics or wadding-layers of natural fibers in the case of neutral liquids have not been at the disposal of the manufacturer.

It is an object of the present invention to provide filter layers which are suitable for filtration on an industrial scale.

A further object is the provision of improved filtering cloths or plates and the like, which are stable against acidic, alkaline, or oxidizing chemicals.

A further object has to do with the provision of an inexpensive and lasting material of high mechanical strength.

Other objects of our invention will become apparent to those skilled in the art after a study of the following specification.

We have discovered that a generally applicable filtering material for liquids of strongly acidic, alkaline or oxidizing action may be obtained by using fabrics, fleeces or felted layers of threads of artificial resins of polymeric hydrocarbons or their chlorinated derivatives or of mixed polymerizates of these substances. Such artificial materials are for example polystyrene, polyisobutylene, polyvinyl ether, mixed polymerizates from styrene or polyisobutylene and vinyl ethers, chlorinated rubber, polyvinyl chloride, after-chlorinated polyvinyl chloride or mixed polymerizates from vinyl chloride with other compounds capable of polymerization such as styrene, polyisobutylene, vinyl ethers and vinyl esters.

The manufacture of fibers and threads from these artificial substances is known and practised on a large scale. Reference is here made to U. S. Patent No. 2,190,265 dated Feb. 13, 1940, issued on application Ser. No. 118,916 filed January 2, 1937 where the method of producing suitable threads from polyvinyl resins is disclosed (compare also British Patent No. 387,976).

As filter layers fabrics may be used consisting of threads, felts, slivers or loose layers of continuously spun artificial fibers or such as has been made from artificial staple fiber cut or torn from such continuously spun material.

Especially suitable for industrial purposes are filter cloths which may be used in filter presses. These cloths must be closely woven from threads of artificial polyvinyl resins. They have the special advantage that in most cases no frames are necessary, since a stiffening of the edges of the filter cloths may be obtained by heating and pressing the marginal parts.

From the above mentioned fiber fleeces and felted layers there may be obtained bodies permeable to liquids and gases. By applying pressure and heat to the fiber fleeces or felted layers these are formed into more or less rigid articles which may possess the shape of plates, tubes, cardboard sheets, etc. The rigid and stiff filter plates thus produced may be employed as diaphragms for electric cells. Their porosity may be adjusted at will by changing the thickness of the layers, by altering the amount of pressure and degree of temperature or by incorporating with the layers solid bodies which are capable of being again removed after the shaping operation. To the material from which these sheets are formed there may be added before the working up thereof fillers which are stable against alkalies and acids such as for instance barite, kaolin, graphite and similar masses. In order to stiffen the sheets or diaphragms, rods, wire-nettings or suitably formed work pieces from chemically indifferent materials may be incorporated with the compressed masses. If desired, suitable plasticizing agents may be added to the artificial resins.

Filter layers made from such materials are well suited for filtering acids, alkalies and oxidizing liquids as well as others which attack the usual filter layers. They constitute therefore a universally applicable material for filtration of chemically active liquids. They are stable against concentrated alkali such as potash and soda lye, concentrated acids such as hydrofluoric acid, hydrochloric acid, phosphoric acid, sulfuric acid or aqua regia as well as to chlorine liquors, hydrogen peroxide, cuprammonia solution or to the other liquids which destroy known organic or inorganic filtering materials. They are inapplicable only for organic liquids which have a solvent action on the artificial material in question.

The following examples serve to illustrate the invention. The invention is, however, generally applicable and not limited to the specific details set out in the examples.

*Example 1.*—A card fleece of sufficient thickness of polymerized vinyl chloride is pressed to yield a permeable but still comparatively dense foil at a moderate temperature so that the fibers are slightly softened by the pressure, but do not melt. If in this case pressing matrices or pressing rollers are employed which have the surface patterning of the usual filtering papers, papers are obtained which do not externally differ from the usual cellulose filter papers. The filter papers from polymerized vinyl chloride thus produced are absolutely stable against acids and alkalies.

*Example 2.*—Fibers from mixed polymerizates of 80 parts of vinyl chloride and 20 parts of acrylic acid methyl ester, which fibers are obtained according to the aforementioned U. S. Patent No. 2,190,265 (British Patent No. 387,976), are ground in a rag or pulp engine, if desired with the addition of wetting agents and protective colloids. From the paste of fibers thus produced a foil is formed according to the methods of the paper and cardboard making industry. After drying and compressing in the cold this foil is calendered from both sides in the warmth. A filter material is obtained which externally resembles the usual filtering papers and which is used in the same manner as the hitherto known cellulose filtering papers.

In the claims following hereafter the term "filter" indicates all kinds of filtering appliances whether for liquids or gases and whether in the form of flexible cloths or sheets or rigid diaphragms and the term "fibers" is intended to mean unwoven fibers in the form of loose or felted layers, fleeced, solid and pressed sheets as well as woven fabrics.

What we claim is:

1. A process of producing filters substantially stable against inorganic chemicals which process comprises heating a fabric consisting of filaments of polyvinyl resins to a temperature sufficiently elevated to partially soften said vinyl resins to adjust the porosity of said fabric.

2. A process of producing filters substantially stable against inorganic chemicals from materials consisting of fibers of polyvinyl resins which comprises forming a layer of said fibers and heating said fibers to a temperature sufficiently elevated partially to soften said vinyl resins to adjust the porosity of said layer.

3. The process as defined in claim 1 wherein the vinyl resin is a polyvinyl chloride.

4. The process as defined in claim 1 wherein said vinyl resin is polystyrole.

5. The process as defined in claim 1 wherein said vinyl resin is a polyvinyl ether.

WALTER HARZ.
HERBERT REIN.
EMIL HUBERT.
CARL KAYSER.